(12) United States Patent  
Yang et al.

(10) Patent No.: US 8,357,306 B2  
(45) Date of Patent: Jan. 22, 2013

(54) NON-NITROGEN SULFIDE SWEETENERS

(75) Inventors: Jianzhong Yang, Missouri City, TX (US); Matthew T. Barnes, Houston, TX (US); Joseph L. Stark, Richmond, TX (US)

(73) Assignee: Baker Hughes Incorporated, Houston, TX (US)

( * ) Notice: Subject to any disclaimer, the term of this patent is extended or adjusted under 35 U.S.C. 154(b) by 170 days.

(21) Appl. No.: 12/972,765

(22) Filed: Dec. 20, 2010

(65) Prior Publication Data

US 2012/0152857 A1 Jun. 21, 2012

(51) Int. Cl.  
*C02F 1/68* (2006.01)

(52) U.S. Cl. ......... 210/749; 208/189; 208/237; 208/240

(58) Field of Classification Search .................. 210/749, 210/758; 208/189, 237, 240  
See application file for complete search history.

(56) References Cited

U.S. PATENT DOCUMENTS

| | | | | |
|---|---|---|---|---|
| 3,459,852 | A | * | 8/1969 | Roehm ........................ 210/758 |
| 4,389,221 | A | * | 6/1983 | Graiff et al. ..................... 44/304 |
| 4,680,127 | A | | 7/1987 | Edmondson |
| 4,978,512 | A | | 12/1990 | Dillon |
| 5,173,213 | A | | 12/1992 | Miller et al. |
| 5,213,680 | A | | 5/1993 | Kremer et al. |
| 5,347,004 | A | | 9/1994 | Rivers et al. |
| 5,395,536 | A | | 3/1995 | Brown et al. |
| 5,552,060 | A | | 9/1996 | Roof |
| 5,840,177 | A | | 11/1998 | Weers et al. |
| 5,958,352 | A | | 9/1999 | Callaway et al. |
| 6,013,175 | A | | 1/2000 | Weers et al. |
| 6,024,866 | A | | 2/2000 | Weers et al. |
| 6,068,056 | A | | 5/2000 | Frenier et al. |
| 6,117,310 | A | | 9/2000 | Rivers |
| 6,339,153 | B1 | | 1/2002 | Rivers et al. |
| 6,656,445 | B2 | | 12/2003 | Schield et al. |
| 6,663,841 | B2 | | 12/2003 | Salma et al. |
| 6,887,447 | B2 | | 5/2005 | Schield et al. |
| 7,438,877 | B2 | | 10/2008 | Salma et al. |
| 7,718,586 | B2 | | 5/2010 | Schield et al. |

FOREIGN PATENT DOCUMENTS

EP 0012478 A2 12/1979

OTHER PUBLICATIONS

Amosa, M.K. e al., "Sulphide Scavengers in Oil and Gas Industry—A Review," NAFTA 61 (2) pp. 85-92 (2010).

* cited by examiner

*Primary Examiner* — Lucas Stelling  
(74) *Attorney, Agent, or Firm* — Mossman, Kumar & Tyler, P.C.

(57) ABSTRACT

A process for removing a sulfur species from a stream selected from the group consisting of a hydrocarbon stream, an aqueous stream, and mixtures thereof is disclosed herein, which may include introducing a treating mixture into the stream. The treating mixture may include a compound of the general formula selected from the group consisting of:

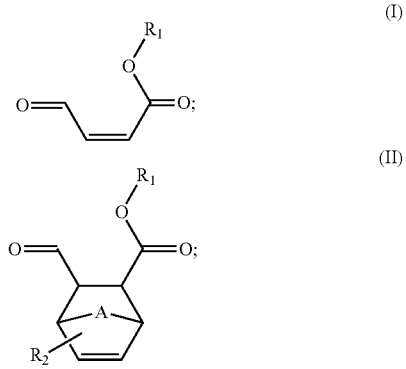

or combinations of compound (I) or compound (II). $R_1$ may be a $C_1$-$C_{30}$ hydrocarbyl group that is saturated, unsaturated, cyclic or branched, or may contain a heteroatom. 'A' may be an oxygen atom or a methylene group. $R_2$ may be a $C_1$-$C_{30}$ hydrocarbyl group that may be saturated, unsaturated, cyclic or branched, or may contain a heteroatom(s) other than C and H. The treating mixture may reduce the reactive sulfur species in the stream. The sulfur species reduced from the stream may be hydrogen sulfide, mercaptans, polysulfides, or combinations thereof.

20 Claims, No Drawings

NON-NITROGEN SULFIDE SWEETENERS

TECHNICAL FIELD

The present invention relates to the removal of reactive sulfur species from a stream selected from the group consisting of a hydrocarbon stream, an aqueous stream, and mixtures thereof; where the treating mixture may be introduced into the stream.

TECHNICAL BACKGROUND

The presence of sulfur species in hydrocarbon fluids and aqueous streams is undesirable for various reasons. The subterranean reservoirs currently being developed have increased amounts of sulfur species within the produced hydrocarbon streams (oil and gas). Hydrogen sulfide and mercaptans are toxic gases that are heavier than air and are very corrosive to well and surface equipment.

During combustion, sulfur-rich hydrocarbon streams also produce heavy environmental pollution. When sulfur-rich streams contact metals, sulfur species lead to brittleness in carbon steels and to stress corrosion cracking in more highly alloyed materials. Moreover, hydrogen sulfide and mercaptans, in various hydrocarbon or aqueous streams pose a safety hazard and a corrosion hazard. A quick removal of these odorous and environmental malicious species would be desirable in both oilfield and refinery operations.

For the reasons mentioned, attempts have been made to wash out, or chemically convert, the sulfur species from hydrocarbon fluids and aqueous systems. Sour gas is natural gas or any other gas containing significant amounts of hydrogen sulfide ($H_2S$), thus removing $H_2S$ and other sulfur-containing sour compounds may be understood as "sweetening". There are several classes of sweeteners available for removing sulfur species from a hydrocarbon or aqueous stream, but many of them have serious limitations. For example, nitrogen-containing hydrogen sulfide sweeteners, such as hydrotriazine-based additives, have been in the industry for a long while now. However, the amines released while scavenging the sulfur species pose an overhead corrosion threat in various downstream processes, including distillation columns. Formaldehyde is a nitrogen-free sweetener, but it is also a potential carcinogen. Glyoxal is another nitrogen-free hydrogen sulfide sweetener, but its application is often limited due to its corrosivity and low boiling point. Metal oxides have also been proposed, but such applications are narrowed by the handling challenges and solid residual formation concerns to downstream refining catalysts and processes. Acrolein is a clean and extremely potent hydrogen sulfide/mercaptan sweetener, but it requires special handling due to toxicity concerns.

Thus, it would be desirable if a non-nitrogen sweetener could be discovered that has improved efficiency and capacity for increased sulfur-compound removal, and is less corrosive, easy to handle, as well as having a lesser degree of flash point concern.

SUMMARY

There is provided, in one non-limiting form, a process for removing a sulfur species from a stream selected from the group consisting of a hydrocarbon stream, an aqueous stream, and mixtures thereof; where a treating mixture may be introduced into the stream. The treating mixture may include a compound of the general formula selected from the following:

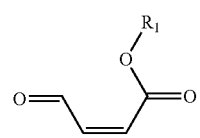

(I)

$R_1$ may be a $C_1$-$C_{30}$ hydrocarbyl group that is saturated, unsaturated, cyclic or branched, or may contain a heteroatom(s) other than C and H; or

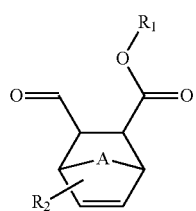

(II)

$R_1$ may be the same as above. 'A' may be an oxygen atom or a methylene group. $R_2$ may be a $C_1$-$C_{30}$ hydrocarbyl group that may be saturated, unsaturated, cyclic or branched, or may contain a heteroatom(s) other than C and H. The treating mixture may also include combinations of compound (I) and compound (II).

There is further provided in another non-limiting embodiment a process of reducing the amount of the sulfur species in the stream to 200 ppmv or below. By "200 ppmv" is meant either 200 ppmv by volume. The amount of the treating mixture that may be introduced into the stream is in the range of from about 1 ppmv to about 50,000 ppmv.

DETAILED DESCRIPTION

A new class of non-nitrogen sulfide sweeteners has been discovered that reduces the sour sulfur species within a hydrocarbon or aqueous stream. Reducing the souring sulfur species may also decrease the corrosion to the well and surface equipment. The targeted sulfur species may include hydrogen sulfide, mercaptans, polysulfides, combinations thereof, or other sulfur compounds found in hydrocarbon or aqueous streams known by those skilled in the art. A mercaptan may be any sulfur-containing compound of the general formula R—SH, such as ethyl mercaptan/ethanethiol. The use of the term 'polysulfide' herein generally refers to a class of sulfur species with alternating chains of sulfur atoms and hydrocarbons, such as —$[(CH_2)_m$—$S_x]_n$—.

The amount of the sulfur species in the hydrocarbon or aqueous stream may be reduced to about 200 ppmv or below, in one non-limiting embodiment to about 10 ppmv or below, alternatively to about 1 ppmv or below. It is difficult to predict with precision the dosage of the treating mixture required to lower or eliminate $H_2S$, mercaptans and/or polysulfides in a stream. An optimum application level will depend on a number of factors, including, but not limited to, the nature of any hydrocarbons in the stream, the level of $H_2S$ and/or mercaptans and/or polysulfides, the nature of the mercaptans and their proportions, the temperature of the stream, the particular nature of the compounds in the treating mixture, etc. However, to give a sense of appropriate treating levels, a treating mixture may be introduced into the hydrocarbon or aqueous stream in the range of from about 1 ppmv independently to about 50,000 ppmv, in one non-limiting embodiment from about 20 ppmv independently to about 10,000 ppmv, alternatively from about 50 ppmv independently to about 5,000 ppmv. As used herein with respect to a range, "independently" means that any lower threshold may be used together with any upper threshold to give a suitable alternative range. The treating mixture may include a compound of the general formula selected from the group consisting of:

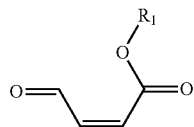
(I)

where:
$R_1$ may be a $C_1$-$C_{30}$ hydrocarbyl group that is saturated, unsaturated, cyclic or branched, or may contain a heteroatom(s) other than C and H;

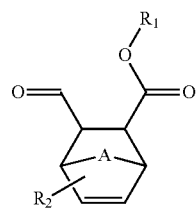
(II)

where:
$R_1$ may be as above,
where 'A' may be an oxygen atom or a methylene group,
where $R_2$ may be a $C_1$-$C_{30}$ hydrocarbyl group that may be saturated, unsaturated, cyclic or branched, or may contain a heteroatom(s) other than C and H.
The treating mixture may be combinations of compound (I) and compound (II).

The treating mixture in one useful, non-limiting embodiment, may also include a compound of formula (III)

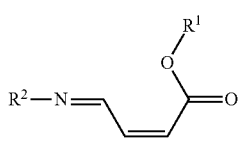
(III)

where:
$R_1$ may be as above, and
$R_2$ may be as above.

The hydrocarbyl of the $R_1$ group may be selected from the class consisting of a $C_1$-$C_{30}$ alkyl or alkenyl group, an oxygenated ether linkage, or a hydrocarbyl group having a cyclic or an aromatic ring structure. The hydrocarbyl of the $R_1$ group may be an ethyl group or a methyl group, a polyethylene glycol group, or an ethoxylated alkylphenol group. The $R_2$ hydrocarbyl group of compound (II) may be selected from the class consisting of an alkyl group or an alkenyl group; a hydrocarbyl group that may contain an O, P, or another heteroatom; or a hydrocarbyl group that may contain a cyclic or an aromatic structure. The $R_2$ hydrocarbyl group of the compound (II) may be an isopropyl group, an ethanol, or a phenyl group. In one non-limiting embodiment, ethyl trans-4-oxo-2-butenoate may be selected as the compound within the treating mixture useful for reducing a sulfur species within a hydrocarbon stream.

The treating mixture may be hydrophobic, hydrophilic, or mixtures thereof, and it may also include a solvent. The solvent may be an aromatic solvent, such as Aromatic 100, Aromatic 150, kerosene, diesel, or mixtures thereof. The concentration of the solvent within the treating mixture may be from about 1 to about 99 wt %. The concentration of the compound within the treating mixture may be from about 1 to about 99 wt % of the treating mixture. The treating mixture may also include a corrosion inhibitor, a dehazer, or a conductivity improver.

The treating mixture may be used in conventional "in-line" injection systems and injected at any point in-line suitable to allow the mixture to react with the gaseous or liquid stream, e.g. at the well-head, separators, etc. The treating mixture may also be used in conventional scrubber tower systems. Other applications of the treating mixtures described herein in other conventional systems or systems to be developed will become apparent to those skilled in the art.

The method will be described further in the following illustrative Examples, which are non-limiting and serve only to further illuminate and teach the method.

EXAMPLES 1-4

Example 1

The initial blank of the hydrocarbon blend had 3,000 ppmv of hydrogen sulfide ($H_2S$) in the gas phase at ambient temperature and ambient pressure. The blank as tested, at 60 C.°, had 1,050 ppmv of $H_2S$. In a typical test, a treating mixture having 150 ppmv of ethyl trans-4-oxo-2-butenoate was introduced to a crude hydrocarbon blend at ambient temperature and ambient pressure. Four hours after the stream was treated, the sample was collected and tested. The $H_2S$ was reduced to about 200 ppmv within the hydrocarbon blend as tested in the vapor phase, which resulted in an 81% reduction.

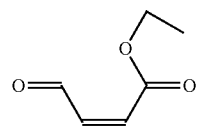
(IV)

Above is a representative structure of ethyl trans-4-oxo-2-butenoate material.

The initial blank of the hydrocarbon blend had 3,000 ppmv of $H_2S$ at ambient temperature and ambient pressure. The blank as tested, at 60 degrees C.°, had 1,050 ppmv of $H_2S$. A treating mixture having 300 ppmv of ethyl trans-4-oxo-2-butenoate was introduced to a crude hydrocarbon blend at ambient temperature and ambient pressure. Four hours after the stream was treated, the sample was collected and tested. The $H_2S$ was reduced to about 50 ppmv within the hydrocarbon blend as tested in the vapor phase, which resulted in a 95% reduction.

Example 3

The initial blank of the aqueous sample had 3,000 ppmv of $H_2S$ at ambient temperature and ambient pressure. The blank as tested, at 60 degrees C.°, had 1,425 ppmv of $H_2S$. A treating mixture having 150 ppmv of ethyl trans-4-oxo-2-butenoate was introduced to an aqueous sample at ambient temperature and ambient pressure. Four hours after the stream was treated, the sample was collected and tested. The H₂S was reduced to about 550 ppmv within the aqueous system as tested in the vapor phase, which resulted in a 61% reduction.

Example 4

The initial blank of the aqueous sample had 3,000 ppmv of H₂S at ambient temperature and ambient pressure. The blank as tested, at 60 degrees C.°, had 1,425 ppmv of H₂S. A treating mixture having 300 ppmv of ethyl trans-4-oxo-2-butenoate was introduced to an aqueous sample at ambient temperature and ambient pressure. Four hours after the stream was treated, the sample was collected and tested. The H₂S was reduced to about 200 ppmv within the aqueous system as tested in the vapor phase, which resulted in an 86% reduction.

Example 5

The initial blank of the aqueous sample had 3,000 ppmv of H₂S at ambient temperature and ambient pressure. The blank as tested, at 60 degrees C.°, had 1,425 ppmv of H₂S. A treating mixture having 450 ppmv of ethyl trans-4-oxo-2-butenoate was introduced to an aqueous sample at ambient temperature and ambient pressure. Four hours after the stream was treated, the sample was collected and tested. The H₂S was reduced to about 100 ppmv within the aqueous system as tested in the vapor phase, which resulted in a 93% reduction.

TABLE I

| Example # | Treat rate, ppm | [H₂S], ppm (Vapor phase) | % Reduction |
|---|---|---|---|
| 1 | 150 | 200 | 81% |
| 2 | 300 | 50 | 95% |

The results depicted in Table I show an overall sulfur reduction when the treating mixture was tested on the hydrocarbon blends. More specifically, there was an 81% sulfur reduction in Example 1 and a 95% sulfur reduction in Example 2.

TABLE II

| Example # | Treat rate, ppm | [H₂S], ppm (Vapor phase) | % Reduction |
|---|---|---|---|
| 3 | 150 | 550 | 61% |
| 4 | 300 | 200 | 86% |
| 5 | 450 | 100 | 93% |

The results depicted in Table II show an overall sulfur reduction when the treating mixture was tested on the aqueous samples. There was a 61% sulfur reduction in Example 3, an 86% sulfur reduction in Example 4, and a 93% sulfur reduction in Example 5.

It is to be understood that the invention is not limited to the exact details of reaction conditions, proportions, etc. shown and described, as modifications and equivalents will be apparent to one skilled in the art. Accordingly, the invention is therefore to be limited only by the scope of the appended claims. Further, the specification is to be regarded as an illustrative, rather than a restrictive, sense. For example, specific combinations of compounds (I), (II), and/or (III); reactant proportions; reaction conditions; molecular weights; dosages and the like; falling within the claimed parameters but not specifically identified or tried in a particular method, are anticipated to be within the scope of this invention.

The terms "comprises" and "comprising" in the claims should be interpreted to mean including, but not limited to, the recited elements.

The present invention may suitably comprise, consist or consist essentially of the elements disclosed and may be practiced in the absence of an element not disclosed. For instance, the process may consist essentially of or consist of a process for removing a sulfur species from a hydrocarbon or aqueous stream by introducing a treating mixture consisting essentially of or consisting of compounds of formula (I) and/or (II) and optionally (III) into the hydrocarbon or aqueous stream.

What is claimed is:

1. A process for removing a sulfur species from a stream selected from the group consisting of a hydrocarbon stream, an aqueous stream, and mixtures thereof; which comprises introducing a treating mixture into the stream where the treating mixture comprises a compound of the general formula selected from the group consisting of:

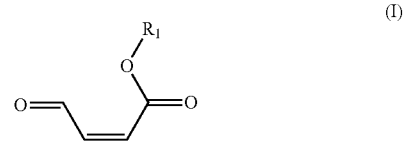

where:
R₁ is a C₁-C₃₀ hydrocarbyl group that is saturated, unsaturated, cyclic or branched, or contains a heteroatom(s) other than C and H;

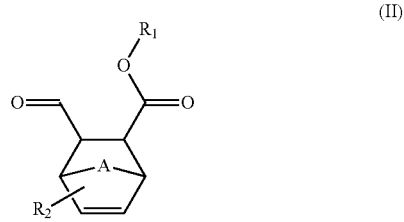

where:
R₁ is as above,
where A is an oxygen atom or a methylene group,
where R₂ is a C₁-C₃₀ hydrocarbyl group that is saturated, unsaturated, cyclic or branched, or contains a heteroatom(s) other than C and H;
and combinations of compound (I) and compound (II).

2. The process of claim 1 where the treating mixture further comprises a compound of formula (III)

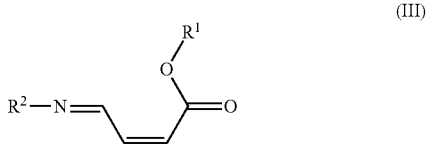

where:
R₁ is as above, and
R₂ is as above.

3. The process of claim 1 where the treating mixture further comprises a solvent.

4. The process of claim 3 where the concentration of the solvent within the treating mixture is from about 1 to about 99 wt %.

5. The process of claim 3 where the solvent is an aromatic solvent.

6. The process of claim 3 where the concentration of the compound within the treating mixture is from about 1 to about 99 wt % of the treating mixture.

7. The process of claim 1 where the hydrocarbyl of the $R_1$ group is selected from the class consisting of an alkyl or alkenyl group, an oxygenated ether linkage, or a hydrocarbyl group having a cyclic or an aromatic ring structure.

8. The process of claim 7 where the hydrocarbyl of the $R_1$ group is an ethyl group, a methyl group, a polyethylene glycol group, or an ethoxylated alkylphenol group.

9. The process of claim 1 where the $R_2$ hydrocarbyl group of compound (II) is selected from the class consisting of an alkyl group; an alkenyl group; a hydrocarbyl group having an oxygen, a phosphorous, or another heteroatom; or a hydrocarbyl group that contains a cyclic or an aromatic structure.

10. The process of claim 9 where the $R_2$ hydrocarbyl group of the compound (II) is an isopropyl group, an ethanol, or a phenyl group.

11. The process of claim 1 where the sulfur species is selected from the group consisting of hydrogen sulfide, mercaptans, polysulfides, and combinations thereof.

12. The process of claim 1 where the amount of the sulfur species in the stream is reduced to about 200 ppmv or below.

13. The process of claim 1 where the amount of the treating mixture is introduced into the stream in the range of from about 1 ppmv to about 50,000 ppmv.

14. The process of claim 13 where the amount of the compound within the treating mixture is introduced into the stream in the range of from about 50 ppmv to about 5,000 ppmv.

15. A process for removing a sulfur species from a stream selected from the group consisting of a hydrocarbon stream, an aqueous stream, and mixtures thereof; which comprises introducing a treating mixture into a stream where the treating mixture comprises a compound of the general formula selected from the group consisting of:

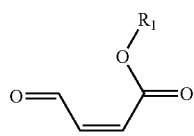

where:
$R_1$ is a $C_1$-$C_{30}$ hydrocarbyl group that is saturated, unsaturated, cyclic or branched, or contains a heteroatom(s) other than C and H;

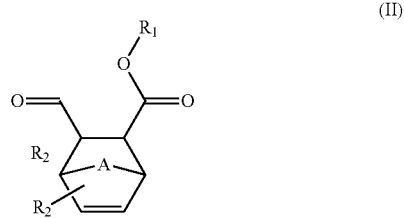

where:
$R_1$ is as above,
where A is an oxygen atom or a methylene group,
where $R_2$ is a $C_1$-$C_{30}$ hydrocarbyl group that is saturated, unsaturated, cyclic or branched, or contains a heteroatom(s) other than C and H;
and combinations of compound (I) and compound (II); and
where the amount of the sulfur species in the stream is reduced to about 200 ppmv or below; and where the amount of the treating mixture is introduced into the stream in the range of from about 1 ppmv to about 50,000 ppmv.

16. The process of claim 15 where the treating mixture further comprises a compound of formula (III)

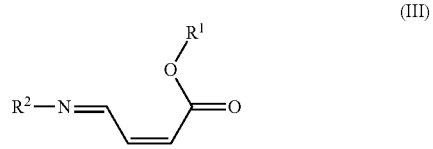

where:
$R_1$ is as above, and
$R_2$ is as above.

17. The process of claim 15 further comprising another compound within the treating mixture selected from the group consisting of a hydrotriazine-based compound, a metal oxide based compound, a metal hydroxide based compound, an amine based compound, or mixtures thereof.

18. The process of claim 15 where the hydrocarbyl of the $R_1$ group is selected from the class consisting of an alkyl or alkenyl group, an oxygenated ether linkage, or a hydrocarbyl group having a cyclic or an aromatic ring structure.

19. The process of claim 15 where the $R_2$ hydrocarbyl group of compound (II) is selected from the class consisting of an alkyl group; an alkenyl group; a hydrocarbyl group having an oxygen, a phosphorous, or another heteroatom; or a hydrocarbyl group that contains a cyclic or an aromatic structure.

20. The process of claim 15 where the amount of the compound within the treating mixture is introduced into the stream in the range of from about 50 ppmv to about 5,000 ppmv.

* * * * *

UNITED STATES PATENT AND TRADEMARK OFFICE
CERTIFICATE OF CORRECTION

PATENT NO.        : 8,357,306 B2
APPLICATION NO.   : 12/972765
DATED             : January 22, 2013
INVENTOR(S)       : Jianzhong Yang It is certified that error appears in the above-identified patent and that said Letters Patent is hereby corrected as shown below:

In the Specification:

At column 1, line 33, please delete both occurrences of "$H_{25}$" and insert therefore -- $H_2S$ --.

Signed and Sealed this
Twenty-first Day of May, 2013

Teresa Stanek Rea
*Acting Director of the United States Patent and Trademark Office*